US009535297B2

(12) United States Patent
Zheng

(10) Patent No.: US 9,535,297 B2
(45) Date of Patent: Jan. 3, 2017

(54) LIQUID CRYSTAL DISPLAYS AND ARRAY SUBSTRATES

(71) Applicant: Shenzhen China Star Optoelectronics Technology Co., Ltd., Shenzhen, Guangdong (CN)

(72) Inventor: Hua Zheng, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 344 days.

(21) Appl. No.: 14/385,996

(22) PCT Filed: Sep. 3, 2014

(86) PCT No.: PCT/CN2014/085853
§ 371 (c)(1),
(2) Date: Sep. 17, 2014

(87) PCT Pub. No.: WO2016/029501
PCT Pub. Date: Mar. 3, 2016

(65) Prior Publication Data
US 2016/0246122 A1 Aug. 25, 2016

(30) Foreign Application Priority Data
Aug. 27, 2014 (CN) .......................... 2014 1 0429513

(51) Int. Cl.
G02F 1/1343 (2006.01)
G02F 1/133 (2006.01)
G02F 1/1362 (2006.01)
G02F 1/1368 (2006.01)

(52) U.S. Cl.
CPC ......... *G02F 1/134309* (2013.01); *G02F 1/133* (2013.01); *G02F 1/1343* (2013.01); *G02F 1/1362* (2013.01); *G02F 1/1368* (2013.01); *G02F 1/13439* (2013.01); *G02F 1/136286* (2013.01)

(58) Field of Classification Search
CPC .................... G02F 1/134363; G02F 1/136286; G02F 1/1368; G02F 1/133707; G02F 1/1362; G02F 1/134309; G02F 1/134336; G02F 1/1343; G02F 2001/134372; G02F 2001/134318
USPC ....... 257/72, 59, E31.124; 349/141, 43, 139, 349/143
See application file for complete search history.

(56) References Cited

U.S. PATENT DOCUMENTS

2010/0066952 A1* 3/2010 Tsuchiya ........... G02F 1/133514
349/106

FOREIGN PATENT DOCUMENTS

| CN | 101097307 A | 1/2008 |
|---|---|---|
| CN | 102043298 A | 5/2011 |
| CN | 102253551 A | 11/2011 |

(Continued)

*Primary Examiner* — Thoi Duong
(74) *Attorney, Agent, or Firm* — Andrew C. Cheng

(57) ABSTRACT

A liquid crystal panel and the array substrate thereof are disclosed. Each pixel cells of the liquid crystal panel includes one pixel electrode having a plurality of strip-like gaps and a plurality of strip-like first electrode patterns interleaved with each other. For all of the pixel cells, a sum of the dimension of the first electrode patterns of the pixel cell is gradually decreased along a direction from a central area toward two lateral areas of the liquid crystal panel. In this way, the brightness of the liquid crystal panel is uniform and the "two pale lateral areas" issue may be eased or eliminated.

19 Claims, 3 Drawing Sheets

(56) References Cited

FOREIGN PATENT DOCUMENTS

| CN | 102929052 A | 2/2013 |
| CN | 103091930 A | 5/2013 |

* cited by examiner

LIQUID CRYSTAL DISPLAYS AND ARRAY SUBSTRATES

BACKGROUND OF THE INVENTION

1. Field of the Invention

The present disclosure relates to liquid crystal display technology, and more particularly to a liquid crystal display (LCD) and an array substrate.

2. Discussion of the Related Art

It happens usually that brightness difference between two lateral areas and a central area of the TFT-LCD (Thin Film Transistor-Liquid Crystal Display) is huge, and which results in "two pale lateral areas" issue.

As shown in FIG. 1, the driving voltage for the scanning line (Gate) 11 is inputted from scanning Gate COFs 12 at two lateral sides of the liquid crystal panel 10. As the processor 11 has RC delay such that the scanning driving voltage inputted from two lateral areas may be distorted when being transferred to the central area (A). That is, the waveform of Gate is distorted. The distorted scanning driving voltage may reduce the charging rate of the central area (A) so as to decrease the display brightness thereof. Thus, the brightness of the two lateral areas (B1, B2) is lower than that of the central area. This is the so-called "two pale lateral areas" issue, especially when the liquid crystal panel is displayed at low grayscale value.

SUMMARY

The object of the claimed invention is to provide a liquid crystal panel and the array substrate thereof to obtain uniform display brightness. Also, the "two pale lateral areas" issue may be eased or eliminated.

In one aspect, a liquid crystal panel includes: a plurality of pixel cells, each pixel cell includes one pixel electrode, each pixel electrode includes a plurality of strip-like gaps and a plurality of strip-like first electrode patterns, the gaps and the first electrode patterns are interleaved with each other; wherein for all of the pixel cells, a sum of the dimension of the first electrode patterns of the pixel cell is gradually decreased along a direction from a central area toward two lateral areas of the liquid crystal panel, a width of the first electrode patterns of each pixel cell is gradually decreased and the width of the gap of each pixel cell is gradually increased along the direction, and the sum of the width of the first electrode patterns and the width of the gaps remains the same along the direction; the pixel cell connects to one corresponding scanning line and one corresponding data line, the pixel cell includes a thin film transistor (TFT) for driving the pixel electrode, a gate, a source, and a drain of the TFTs electrically connect to one corresponding scanning line, one corresponding data line and one corresponding pixel electrode; and a source driver and a gate driver connecting to the source driver to provide a scanning voltage for the plurality of pixel cells, and the source driver connects to the data lines for providing the driving voltage for the plurality of pixel cells.

Wherein each pixel electrode includes a first area, a second area, a third area, and a fourth area, the first area and the second area are arranged next to each other in a horizontal direction, the third area and the first area are arranged opposite to each other in a diagonal direction, and the fourth area and the second area are arranged opposite to each other in the diagonal direction.

Wherein a longitudinal direction of the first electrodes in the first area is the same with that of the first electrodes in the third area, and the longitudinal direction of the first electrode in the second area is the same with that of the first electrodes in the fourth area.

Wherein a longitudinal direction of the electrode patterns in the first area and in the third area is a first direction, and the longitudinal direction of the electrode patterns in the second area and in the fourth area is a second direction, and the first direction is vertical to the second direction.

Wherein each pixel electrode further includes a second electrode pattern and third electrode patterns, the second electrode pattern surrounds the first area, the second area, the third area, and the fourth area, and the third electrode patterns area defines the first area, the second area, the third area, and the fourth area.

In another aspect, a liquid crystal panel includes: a plurality of pixel cells, each pixel cell includes one pixel electrode, each pixel electrode includes a plurality of strip-like gaps and a plurality of strip-like first electrode patterns, the gaps and the first electrode patterns are interleaved with each other; and wherein for all of the pixel cells, a sum of the dimension of the first electrode patterns of the pixel cell is gradually decreased along a direction from a central area toward two lateral areas of the liquid crystal panel.

Wherein a width of the first electrode patterns of each pixel cell is gradually decreased and the width of the gap of each pixel cell is gradually increased along the direction, and the sum of the width of the first electrode patterns and the width of the gaps remains the same along the direction.

Wherein each pixel electrode includes a first area, a second area, a third area, and a fourth area, the first area and the second area are arranged next to each other in a horizontal direction, the third area and the first area are arranged opposite to each other in a diagonal direction, and the fourth area and the second area are arranged opposite to each other in the diagonal direction.

Wherein a longitudinal direction of the first electrodes in the first area is the same with that of the first electrodes in the third area, and the longitudinal direction of the first electrode in the second area is the same with that of the first electrodes in the fourth area.

Wherein a longitudinal direction of the electrode patterns in the first area and in the third area is a first direction, and the longitudinal direction of the electrode patterns in the second area and in the fourth area is a second direction, and the first direction is vertical to the second direction.

Wherein each pixel electrode further includes a second electrode pattern and third electrode patterns, the second electrode pattern surrounds the first area, the second area, the third area, and the fourth area, and the third electrode patterns area defines the first area, the second area, the third area, and the fourth area.

Wherein the pixel cell connects to one corresponding scanning line and one corresponding data line, the pixel cell includes a thin film transistor (TFT) for driving the pixel electrode, a gate, a source, and a drain of the TFTs electrically connect to one corresponding scanning line, one corresponding data line and one corresponding pixel electrode.

Wherein the liquid crystal panel further includes a source driver and a gate driver connecting to the source driver to provide a scanning voltage for the plurality of pixel cells, and the source driver connects to the data lines for providing the driving voltage for the plurality of pixel cells.

In another aspect, an array substrate for a liquid crystal panel includes: a plurality of pixel cells, each pixel cell includes one pixel electrode, each pixel electrode includes a plurality of strip-like gaps and a plurality of strip-like first electrode patterns, the gaps and the first electrode patterns are interleaved with each other; and wherein for all of the pixel cells, a sum of the dimension of the first electrode patterns of the pixel cell is gradually decreased along a direction from a central area toward two lateral areas of the liquid crystal panel.

Wherein a width of the first electrode patterns of each pixel cell is gradually decreased and the width of the gap of each pixel cell is gradually increased along the direction, and the sum of the width of the first electrode patterns and the width of the gaps remains the same along the direction.

Wherein each pixel electrode includes a first area, a second area, a third area, and a fourth area, the first area and the second area are arranged next to each other in a horizontal direction, the third area and the first area are arranged opposite to each other in a diagonal direction, and the fourth area and the second area are arranged opposite to each other in the diagonal direction.

Wherein a longitudinal direction of the first electrodes in the first area is the same with that of the first electrodes in the third area, and the longitudinal direction of the first electrode in the second area is the same with that of the first electrodes in the fourth area.

Wherein a longitudinal direction of the electrode patterns in the first area and in the third area is a first direction, and the longitudinal direction of the electrode patterns in the second area and in the fourth area is a second direction, and the first direction is vertical to the second direction.

Wherein each pixel electrode further includes a second electrode pattern and third electrode patterns, the second electrode pattern surrounds the first area, the second area, the third area, and the fourth area, and the third electrode patterns area defines the first area, the second area, the third area, and the fourth area.

In view of the above, the sum of the dimension of the first electrode of the pixel electrode is decreased gradually along a direction from the central area to two lateral areas. In this way, the liquid crystal efficiency of two lateral areas is decreased, and the light transmission rate of the pixel cells of two lateral areas is decreased also such that the display brightness at two lateral areas are decreased. The brightness difference between the two lateral areas and the central area is reduced or eliminated. Thus, the brightness of the liquid crystal panel is uniform and the "two pale lateral areas" issue may be eased or eliminated.

DETAILED DESCRIPTION OF THE EMBODIMENTS

Embodiments of the invention will now be described more fully hereinafter with reference to the accompanying drawings, in which embodiments of the invention are shown.

Figure 1:
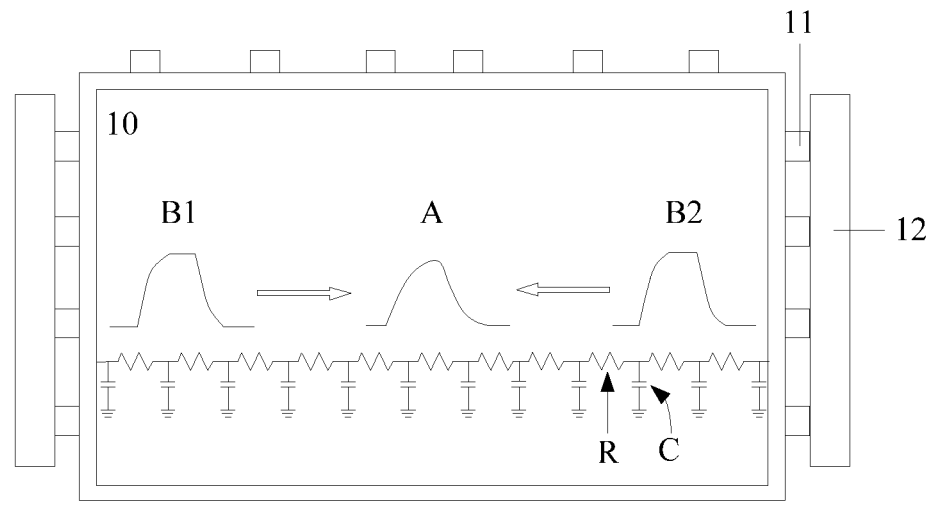
FIG. 1 is a top view of one conventional liquid crystal panel.
Figure 2:
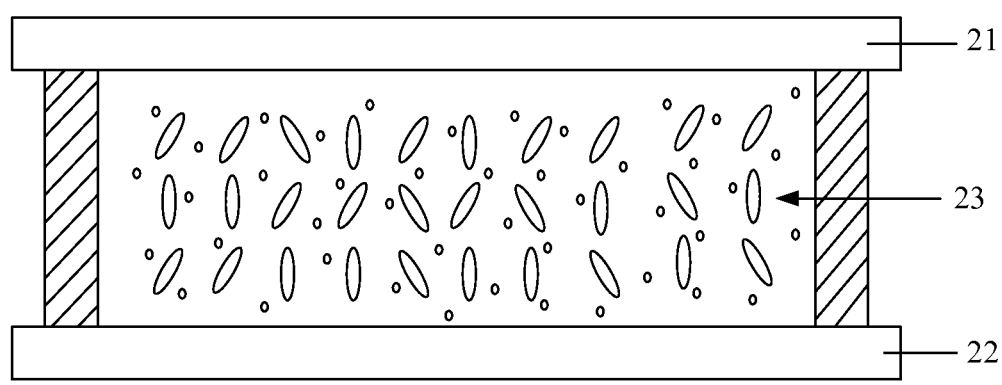
FIG. 2 is a cross-sectional view of the liquid crystal panel in accordance with one embodiment.
Figure 3:
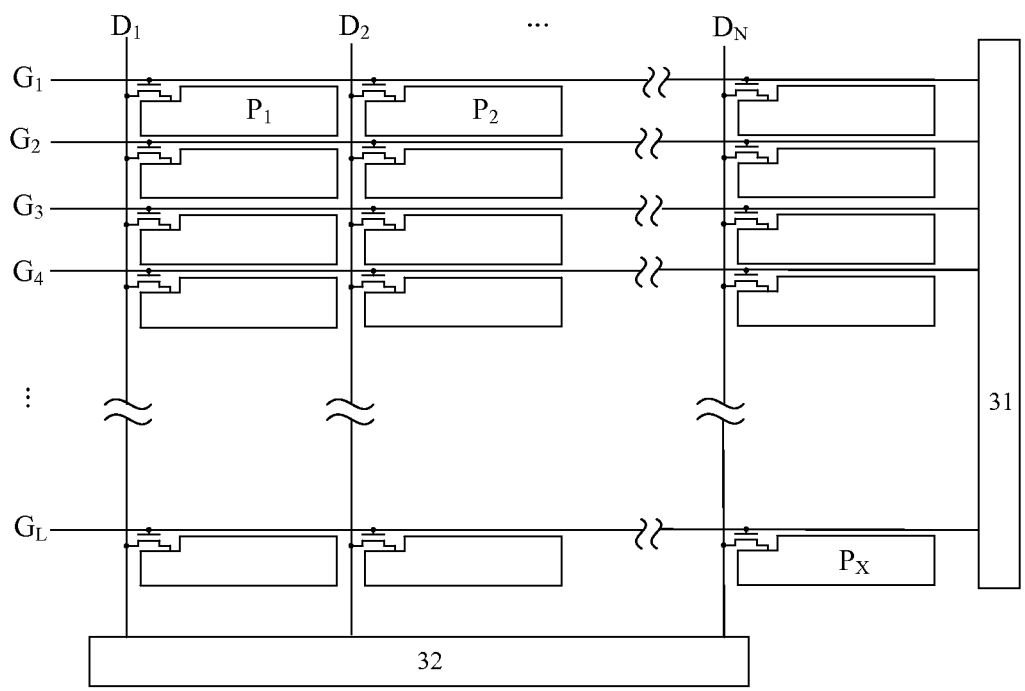
FIG. 3 is a top view of the liquid crystal panel in accordance with one embodiment.
Figure 4:
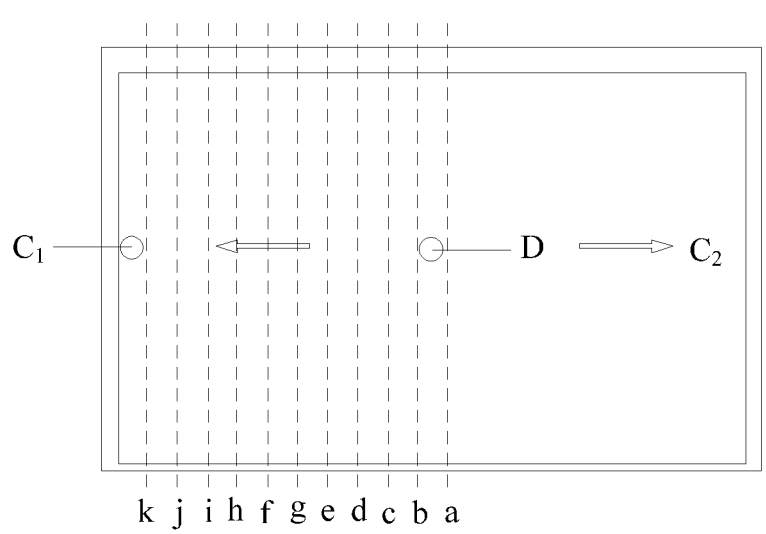
FIG. 4 is a schematic view of the pixel of the liquid crystal panel in accordance with one embodiment.

FIGS. 2 and 3 are respectively a cross-sectional view and a top view of the LCD in accordance with one embodiment. FIG. 4 is a schematic view of the pixel of the LCD in accordance with one embodiment. Referring to FIGS. 2 to 4, the liquid crystal panel 20 includes a first substrate 21, a second substrate 22, and a liquid crystal layer 23. The first substrate 21 and the second substrate 22 are arranged opposite to each other. The second substrate 22 is a color filter (CF) substrate. The first substrate 21 is a thin film transistor (TFT) array substrate. The first substrate 21 includes a transparent substrate and a variety of wires and pixel electrodes arranged on the transparent substrate.

Specifically, the first substrate 21 includes a plurality of data lines ($D_1, D_2, \ldots, D_N$), a plurality of scanning lines ($G_1, G_2, \ldots, G_L$) vertical to the data lines, and a plurality of pixel cells ($P_1, P_2, \ldots, P_X$) defined by the scanning lines ($G_1, G_2, \ldots, G_L$) and the data lines ($D_1, D_2, \ldots, D_N$). Each pixel cell connects to one scanning line and one data line correspondingly.

The scanning lines ($G_1, G_2, \ldots, G_L$) connect to a gate driver 31. The data lines ($D_1, D_2, \ldots, D_N$) connects to a source driver 32. The gate driver 31 is configured for providing a scanning voltage to the pixel cells ($P_1, P_2, \ldots, P_X$). The source driver 32 is configured for providing a driving voltage to the pixel cells ($P_1, P_2, \ldots, P_X$).

Figure 5:
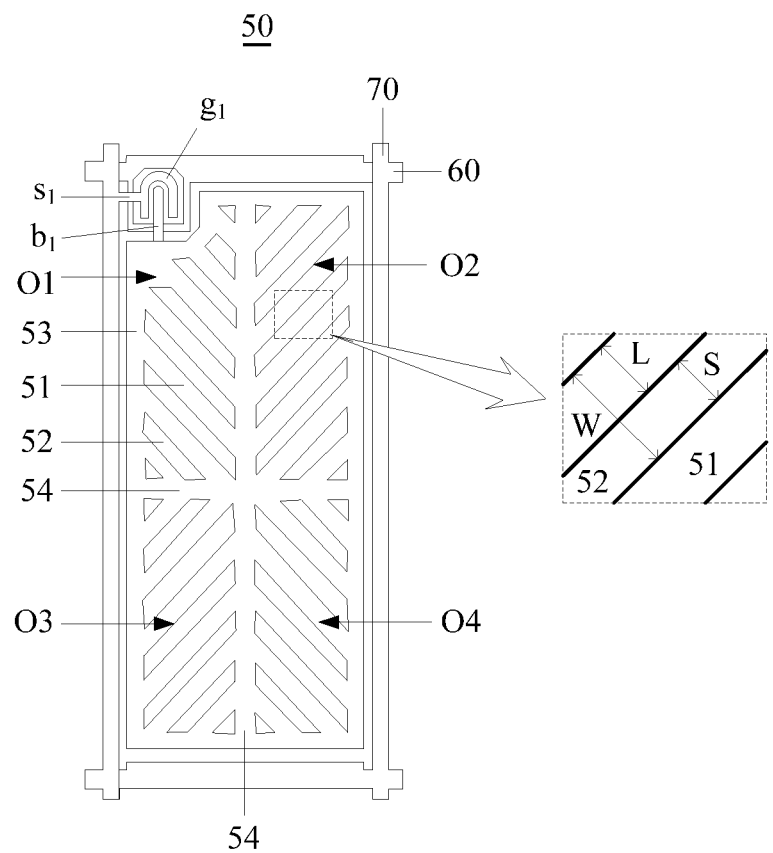
FIG. 5 is schematic view of one pixel cell of the liquid crystal panel of FIG. 3.

FIG. 5 is schematic view of one pixel cell of the liquid crystal panel of FIG. 3. As shown in FIG. 5, the liquid crystal panel 20 includes a plurality of pixel cells ($P_1, P_2, \ldots, P_X$) arranged in a matrix. Each pixel electrode connects to one scanning line and one data line correspondingly. The pixel cell 50 corresponds to one scanning line 60 and one data line 70. Each pixel electrode includes a plurality of strip-like first electrode patterns 51, a plurality of strip-like ITO gaps 52, a strip-like second electrode pattern 53, and two third electrode patterns 54.

The second electrode pattern 53 is configured for limiting a dimension of the aperture of the pixel cell 50. The two strip-like third electrode patterns 54 are vertical to each other to form a crisscross-shaped structure. The third electrode patterns 54 is for defining the first pixel electrode to be a first area (O1), a second area (O2), a third area (O3), and a fourth area (O4). The strip-like second electrode pattern 53 surrounds the first area (O1), the second area (O2), the third area (O3), and the fourth area (O4) to form a rectangular-shaped structure.

In one embodiment, the top-left first area (O1) and the top-right second area (O2) are arranged next to each other in a horizontal direction. The down-right third area (O3) and the first area (O1) are arranged opposite to each other in a diagonal direction. The down-left fourth area (O4) and the second area (O2) are arranged opposite to each other in the diagonal direction. In addition, a longitudinal direction of the electrodes in the first area (O1) is the same with that of the electrodes in the third area (O3), such as the first direction (D1) as shown. The longitudinal direction of the electrodes in the second area (O2) is the same with that of the electrodes in the fourth area (O4), such as the second direction (D2) as shown. The first direction (D1) is vertical to the second direction (D2). In one example, the first direction (D1) and the horizontal axis form an angle equaling to 135 degrees. And the second direction (D1) and the horizontal axis form an angle equaling to 45 degrees.

Within each pixel cell 50, the width (L) of the first electrode patterns 51 of each pixel electrode is the same. In addition, the width (S) of the gap 52 of each pixel electrode is also the same. That is, the width (L) of the first electrode patterns 51 and the width (S) of the gap 52 within each pixel electrode is the same. In addition, the strip-like gaps 52 and the strip-like first electrode patterns 51 are interleaved with each other.

The object of the claimed invention is to decrease a sum of the dimension of the first electrode patterns 51 of the pixel cell 50 among a plurality of pixel cells ($P_1, P2, \ldots, P_X$). The above sum is decreased along a direction from a central area (D) of the liquid crystal panel 20 toward two lateral areas (C1, C2) of the liquid crystal panel 20 as indicated by arrows shown in FIG. 4. Specifically, the width (L) of the first electrode patterns 51 of the pixel electrodes within each pixel cell 50 is decreased in sequence. The width (S) of the gaps 52 of the pixel electrodes within each pixel cell 50 is increased in turn. In addition, the width (L) of the first electrode patterns 51 and the width (S) of the gap 52 is the same.

The transmission rate of the pixel cell (transmission rate of one opening dimension) may be calculated by multiplying the aperture rate by liquid crystal efficiency. This is a conventional equation in the liquid crystal display field. The liquid crystal efficiency of the area corresponding to the first electrode patterns 51 of the pixel cell 50 may be reduced by increasing the width (S) of the gap 52 of the pixel electrode and by decreasing the width (L) of the first electrode patterns 51 between the gaps 52. Also, the transmission rate of the pixel cell 50 in two lateral areas are reduced so as to decrease the brightness of the two lateral areas ($C_1$ and $C_2$). At this moment, the brightness difference between the two lateral areas ($C_1$ and $C_2$) and the central area (D) is decreased, and even more eliminated. In this way, the brightness of the liquid crystal panel 20 is uniform, and the two lateral areas are prevented from being pale.

The structure of the pixel cells ($P_1, P2, \ldots, P_X$) is different. One pixel cell located in the central area (D) and one pixel cell located in two lateral areas ($C_1$) of the liquid crystal panel 20 will be taken as examples. Referring to FIGS. 4 and 5, the width of the first electrode patterns 51 and the width of the gap of the pixel cell 50 in the two lateral areas ($C_1$) are respectively defined as $L_C$ and $H_C$, and the width of the first electrode patterns 51 and the width of the gap of the pixel cell 50 in the central area (D) are respectively defined as $L_D$ and $H_D$. The above parameters satisfy the equation below.

$$L_C < L_D;$$

$$H_C > H_D;$$

$$L_C + H_C = L_D + H_D;$$

In addition, the width difference of the first electrode patterns 51 of the pixel electrodes between two adjacent pixel cell 50 is the same. That is, the width of the first electrode patterns 51 of the pixel cells ($P1, P2, \ldots, P_X$) is decreased by a same amount along a direction from the central area (D) to the two lateral areas ($C_1, C_2$).

In one example, also referring to FIGS. 4 and 5, there are 11 adjacent areas indicated by "a,b,c,d,e,f,g,h,i,j,k". The width of the first electrode patterns 51 of the pixel electrode corresponds to areas "a-f" are respectively 4.0, 3.9, 3.8, 3.7, 3.6, 3.5, 3.4, 3.3, 3.2, 3.1, and 3.0 um.

In addition, it can be seen that the width difference between of the first electrode patterns 51 of the pixel electrode of the pixel cell of the above two adjacent areas are the same, i.e., 0.1 um.

It is to be noted that the structure and the dimension of the first electrode patterns 51 and the gaps 52 of the pixel electrode of the pixel cell 50 in the same area defined by a vertical direction, which is vertical to the direction from the central area (D) to the two lateral areas ($C_1, C_2$).

Figure 6:
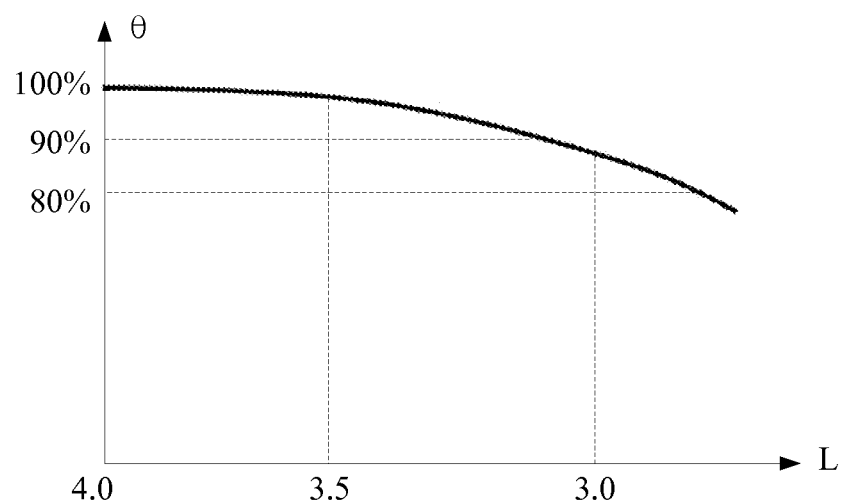
FIG. 6 is a schematic view showing the relationship between the aperture rate of the pixel cell and the length of the pixel electrode of the liquid crystal panel of FIG. 3.

FIG. 6 shows the relationship between the aperture rate of the pixel cell and the length of the pixel electrode on the basis that the sum of the width of the first electrode patterns 51 and the gap 52 of each pixel electrode remains the same. In one example, the sum of the width of the first electrode patterns 51 and the width of the gaps 52 is 6 um. For the central area, L=4 um and S=2 um. The two lateral areas ($C_1$, $C_2$) of the liquid crystal panel 20 are divided into 10 areas. The value of L for each area is decreased by 0.1 um in sequence. Thus, L of the outermost area equals to 3 um, and S of the same area equals to 3 um also. In one embodiment, the 10 areas are defined when designing a mask. The above configuration may be applied to the pixel electrode layer of the liquid crystal panel 20 by lithographic process. When the width (L) of the first electrode patterns 51 is reduced from 4.0 um to 3.0 um, the liquid crystal efficiency (θ) drops for 80 to 90 percent, and the transmission rate of the pixel cell 50 drops for an amount between 80 and 90 percent, which prevents the lateral areas from being pale.

Referring to FIGS. 3-5, the pixel cell 50 also includes TFTs for driving the pixel electrodes. The structure and the dimension of the TFTs of the pixel cells ($P1, P2, \ldots, P_X$) are the same. Each TFTs includes a gate ($g_1$), a source ($s_1$), and a drain ($b_1$). The gate ($g_1$) electrically connects to a corresponding scanning line 60, the source ($s_1$) electrically connects to a corresponding data line 70, and the drain ($d_1$) electrically connects to a corresponding pixel electrode.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal panel, comprising:
   a plurality of pixel cells, each pixel cell comprises one pixel electrode, each pixel electrode comprises a plurality of strip-like gaps and a plurality of strip-like first electrode patterns, the gaps and the first electrode patterns are interleaved with each other;
   wherein for all of the pixel cells, a sum of the dimension of the first electrode patterns of the pixel cell is gradually decreased along a direction from a central area toward two lateral areas of the liquid crystal panel, a width of the first electrode patterns of each pixel cell is gradually decreased and the width of the gap of each pixel cell is gradually increased along the direction, and the sum of the width of the first electrode patterns and the width of the gaps remains the same along the direction;
   the pixel cell connects to one corresponding scanning line and one corresponding data line, the pixel cell comprises a thin film transistor (TFT) for driving the pixel electrode, a gate, a source, and a drain of the TFTs electrically connect to one corresponding scanning line, one corresponding data line and one corresponding pixel electrode; and
   a source driver and a gate driver connecting to the source driver to provide a scanning voltage for the plurality of pixel cells, and the source driver connects to the data lines for providing the driving voltage for the plurality of pixel cells.

2. The liquid crystal panel of claim 1, wherein each pixel electrode comprises a first area, a second area, a third area, and a fourth area, the first area and the second area are arranged next to each other in a horizontal direction, the third area and the first area are arranged opposite to each other in a diagonal direction, and the fourth area and the second area are arranged opposite to each other in the diagonal direction.

3. The liquid crystal panel of claim 2, wherein a longitudinal direction of the first electrodes in the first area is the same with that of the first electrodes in the third area, and the longitudinal direction of the first electrode in the second area is the same with that of the first electrodes in the fourth area.

4. The liquid crystal panel of claim 2, wherein a longitudinal direction of the electrode patterns in the first area and in the third area is a first direction, and the longitudinal direction of the electrode patterns in the second area and in the fourth area is a second direction, and the first direction is vertical to the second direction.

5. The liquid crystal panel of claim 2, wherein each pixel electrode further comprises a second electrode pattern and third electrode patterns, the second electrode pattern surrounds the first area, the second area, the third area, and the fourth area, and the third electrode patterns area defines the first area, the second area, the third area, and the fourth area.

6. A liquid crystal panel, comprising:
a plurality of pixel cells, each pixel cell comprises one pixel electrode, each pixel electrode comprises a plurality of strip-like gaps and a plurality of strip-like first electrode patterns, the gaps and the first electrode patterns are interleaved with each other; and
wherein for all of the pixel cells, a sum of the dimension of the first electrode patterns of the pixel cell is gradually decreased along a direction from a central area toward two lateral areas of the liquid crystal panel.

7. The liquid crystal panel of claim 6, wherein a width of the first electrode patterns of each pixel cell is gradually decreased and the width of the gap of each pixel cell is gradually increased along the direction, and the sum of the width of the first electrode patterns and the width of the gaps remains the same along the direction.

8. The liquid crystal panel of claim 7, wherein each pixel electrode comprises a first area, a second area, a third area, and a fourth area, the first area and the second area are arranged next to each other in a horizontal direction, the third area and the first area are arranged opposite to each other in a diagonal direction, and the fourth area and the second area are arranged opposite to each other in the diagonal direction.

9. The liquid crystal panel of claim 8, wherein a longitudinal direction of the first electrodes in the first area is the same with that of the first electrodes in the third area, and the longitudinal direction of the first electrode in the second area is the same with that of the first electrodes in the fourth area.

10. The liquid crystal panel of claim 8, wherein a longitudinal direction of the electrode patterns in the first area and in the third area is a first direction, and the longitudinal direction of the electrode patterns in the second area and in the fourth area is a second direction, and the first direction is vertical to the second direction.

11. The liquid crystal panel of claim 8, wherein each pixel electrode further comprises a second electrode pattern and third electrode patterns, the second electrode pattern surrounds the first area, the second area, the third area, and the fourth area, and the third electrode patterns area defines the first area, the second area, the third area, and the fourth area.

12. The liquid crystal panel of claim 6, wherein the pixel cell connects to one corresponding scanning line and one corresponding data line, the pixel cell comprises a thin film transistor (TFT) for driving the pixel electrode, a gate, a source, and a drain of the TFTs electrically connect to one corresponding scanning line, one corresponding data line and one corresponding pixel electrode.

13. The liquid crystal panel of claim 12, wherein the liquid crystal panel further comprises a source driver and a gate driver connecting to the source driver to provide a scanning voltage for the plurality of pixel cells, and the source driver connects to the data lines for providing the driving voltage for the plurality of pixel cells.

14. An array substrate for a liquid crystal panel, comprising:
a plurality of pixel cells, each pixel cell comprises one pixel electrode, each pixel electrode comprises a plurality of strip-like gaps and a plurality of strip-like first electrode patterns, the gaps and the first electrode patterns are interleaved with each other; and
wherein for all of the pixel cells, a sum of the dimension of the first electrode patterns of the pixel cell is gradually decreased along a direction from a central area toward two lateral areas of the liquid crystal panel.

15. The array substrate of claim 14, wherein a width of the first electrode patterns of each pixel cell is gradually decreased and the width of the gap of each pixel cell is gradually increased along the direction, and the sum of the width of the first electrode patterns and the width of the gaps remains the same along the direction.

16. The array substrate of claim 15, wherein each pixel electrode comprises a first area, a second area, a third area, and a fourth area, the first area and the second area are arranged next to each other in a horizontal direction, the third area and the first area are arranged opposite to each other in a diagonal direction, and the fourth area and the second area are arranged opposite to each other in the diagonal direction.

17. The array substrate of claim 16, wherein a longitudinal direction of the first electrodes in the first area is the same with that of the first electrodes in the third area, and the longitudinal direction of the first electrode in the second area is the same with that of the first electrodes in the fourth area.

18. The array substrate of claim 16, wherein a longitudinal direction of the electrode patterns in the first area and in the third area is a first direction, and the longitudinal direction of the electrode patterns in the second area and in the fourth area is a second direction, and the first direction is vertical to the second direction.

19. The array substrate of claim 16, wherein each pixel electrode further comprises a second electrode pattern and third electrode patterns, the second electrode pattern surrounds the first area, the second area, the third area, and the fourth area, and the third electrode patterns area defines the first area, the second area, the third area, and the fourth area.

* * * * *